United States Patent [19]
Garfinkle

[11] 3,921,939
[45] Nov. 25, 1975

[54] DIRECTIONAL CONTROL SYSTEM FOR HELICOPTERS

[75] Inventor: Marvin Garfinkle, Cleveland, Ohio

[73] Assignee: Helicorporation, Philadelphia, Pa.

[22] Filed: Jan. 28, 1975

[21] Appl. No.: 544,864

Related U.S. Application Data

[63] Continuation of Ser. No. 370,842, June 18, 1973, abandoned.

[52] U.S. Cl. .......... 244/17.25; 244/17.11; 416/102; 416/148
[51] Int. Cl.² ......................................... B64C 27/52
[58] Field of Search........... 244/17.25, 17.27, 17.11, 244/17.23; 416/102, 129, 148

[56] References Cited
UNITED STATES PATENTS

| | | | |
|---|---|---|---|
| 2,156,334 | 5/1939 | De Bothezat | 244/17.23 |
| 2,434,276 | 1/1948 | Laskowitz | 416/129 X |
| 2,551,455 | 5/1951 | Neale | 244/17.11 |
| 3,045,950 | 7/1962 | Jennings | 244/17.11 |
| 3,765,622 | 10/1973 | Haines | 244/17.11 |

Primary Examiner—Trygve M. Blix
Assistant Examiner—Barry L. Kelmachter
Attorney, Agent, or Firm—Edward E. Sachs

[57] ABSTRACT

A single rotor helicopter in which the transmission, rotor shaft and rotors are jointly suspended from the airframe to provide fore and aft control by rolling contact tilting about a stationary, curved support and in which the dissymmetry of lift is compensated by lateral movement of the transmission about slide rods.

7 Claims, 3 Drawing Figures

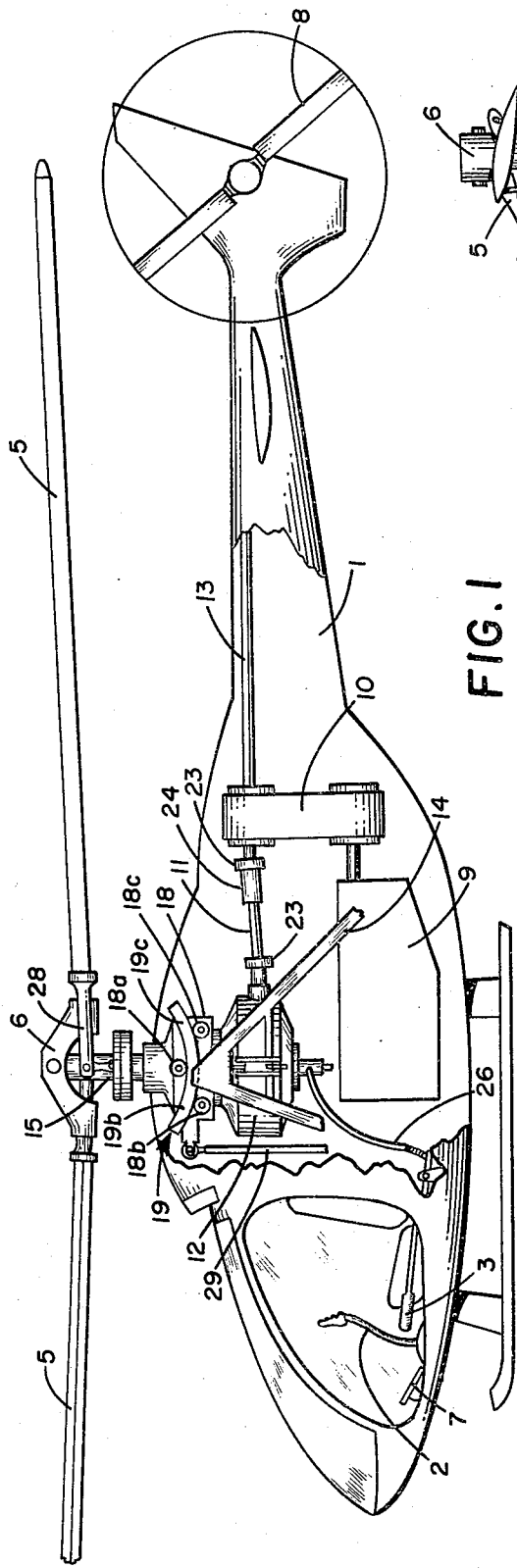
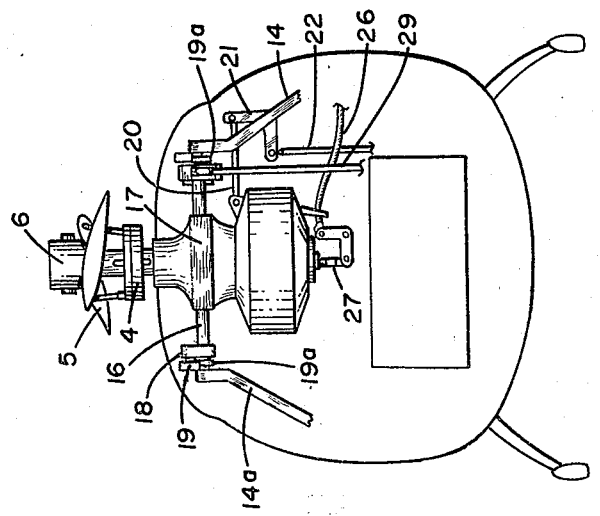
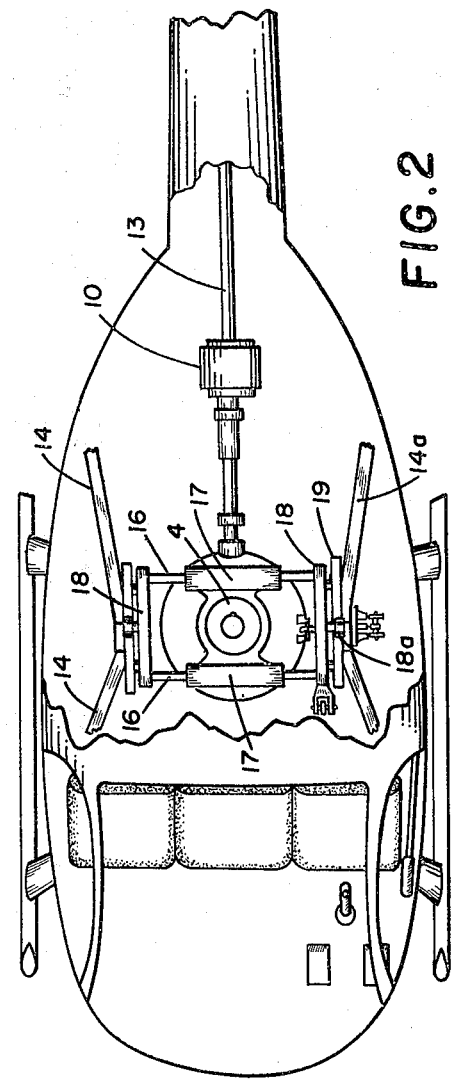
FIG. 1
FIG. 2
FIG. 3

DIRECTIONAL CONTROL SYSTEM FOR HELICOPTERS

This is a continuation of application Ser. No. 370,842, filed June 18, 1973, now abandoned.

This invention relates generally to rotary-winged aircraft and towards improvements in the flight control and stability of helicopters and, more specifically, to achieve relative motion between the transmission connected to a rotor and the main airframe or body of the helicopter.

Lift, propulsion and control are provided for in a fixed-winged aircraft by highly specialized devices designed for a single function. Thus the wings, which provide lift; the propeller or reaction motor, which provides propulsion; and the movable aerodynamic surfaces, which provide control, can be designed to provide these singular functions most efficiently with minimum compromises dictated by other functions. In contrast, lift, propulsion and control of a helicopter is provided by the rotor alone. Consequently, considerable compromise is required in the design of such rotors to satisfy the often conflicting aerodynamic requirements of these functions.

The helicopter rotor comprises a series of airfoil blades attached to a vertical drive shaft. This drive or rotor shaft is customarily driven by an engine through a transmission which usually reduces the higher engine speed to a lower speed suitable to the rotor system. The rotor blades are horizontally hinged to permit flapping but are maintained while rotating in a plane essentially perpendicular to the rotor shaft by centrifugal force.

Flight control of a helicopter requires that the pitch of the individual rotor blades be varied so as to provide both lift and propulsion. Hovering is accomplished by increasing the pitch of all of the blades collectively and equally through a push-rod and bell-crank linkage connected to the collective pitch stick. The collective pitch stick is raised by the pilot until the lift generated by the blades exceeds the weight of the machine. Because the pitch is equal for all of the blades, the rotor disc, defined by the imaginary circle circumscribed by the rotating blade tips, is horizontal and translation of the machine does not occur.

For the greatest hover efficiency, i.e., to require the least power to lift a given load; the blades should be as long as practical and turn as slowly as possible, resulting in blades operating at high pitch angles near their stall limit.

Propulsion for translational flight is provided by tilting the rotor disc in the desired direction of flight, producing a horizontal component of thrust. For forward flight tilting is accomplished by changing the pitch of the blades individually by means of a swash-plate mechanism so that the blades sweeping ahead of the machine flap down and the blades sweeping behind the machine flap up. This motion results in the disc tilting down in front as required for forward flight.

The swash-plate is a complex mechanism common on virtually all operational helicopters. The swash-plate is mounted on the rotor shaft below the rotor head and can be tilted relative to the shaft axis through a push-rod and bell-crank linkage connected to the cyclic pitch stick which is actuated by the pilot. The pitch control rods of the rotor blades follow the tilt of the swash plate which results in a cyclic variation in the pitch of the blades, effecting a tilt in the rotor disc in the direction the cyclic stick is moved. The cyclic variation in blade pitch is superimposed on the collective changes in pitch required for hovering.

In forward flight the speed at which the advancing blade and the retreating blade passes through the air differs. The speed of the advancing blade tip with respect to the relative wind is the sum of the tip speed due to rotation and the forward speed of the machine. The speed of the retreating blade tip is the difference of these two speeds. Thus, the air speed of the advancing blade is greater than that of the retreating by twice the air speed of the machine. This considerable difference in speed between the advancing and retreating blades results in far greater lift being generated on the advancing side of the rotor disc compared with the retreating side. Consequently, the center of lift of the rotor disc is shifted towards the advancing side so that it is no longer over the center of gravity of the machine. This dissymmetry of lift generates a moment that tends to roll the machine over towards the retreating side. To maintain stable flight at forward speeds the lift on either side of the rotor disc must be made equal. This can be accomplished by raising the pitch of the retreating blade while lowering the pitch of the advancing blade with the swash-plate mechanism. However, if the blades are already operating at a pitch angle near their stall limit for hovering efficiency, this procedure could stall the retreating blades, greatly decreasing their lift capability. Consequently, rotor efficiency of operational helicopters must be compromised by operating the rotor at higher speeds. The blades can then operate at a lower average pitch angle to accommodate dissymmetry of lift. Thus, the requirements for propulsion and for lift are conflicting.

Because of dissymmetry of lift, the higher the operating speed of a helicopter, the faster must be the rotor speed. However, with increasing forward speed, the advancing blade tip approaches supersonic speed. The resulting compressibility effect can cause blade flutter and greatly increases power requirements. Thus dissymmetry of lift limits the maximum forward speed of helicopters because of retreating blade stall and advancing blade compressibility effects. Without auxiliary lift or propulsion devices, the practical maximum speed for a helicopter is less than 400 kilometres per hour (250 miles per hour).

It is the prime object of this invention to provide an improved helicopter flight control system that minimizes the effect of dissymmetry of lift by maintaining the center of lift of the rotor disc over the center of gravity of the machine independent of forward speed.

It is another object of this invention to provide a simplified control system for a helicopter by directly effecting the tilt of the rotor disc to provide translational flight.

It is a still further object of the present invention to provide a flight control system for rotary winged aircraft to establish relative motion between the transmission and rotor connected thereto of the aircraft and the main airframe of the aircraft.

It is a still further and specific object of the present invention described in the preceding paragraph in which the transmission can be laterally shifted and rotated fore and aft in a more simplified manner as compared to conventional devices.

For a better understanding of the present invention together with other and further objects thereof, reference is had to the following description taken in connection with the accompanying drawings, and its scope will be pointed out in the appended claims.

In the drawings:

FIGS. 1, 2 and 3 are schematic side, top and front views, respectively, of a helicopter rotor control and power transmission system.

Referring now to the drawings, there is shown in FIGS. 1 to 3 a fuselage 1 enclosing in a substantially conventional manner a single rotor helicopter lift system comprising a conventional cyclic pitch stick 2 and a collective pitch stick 3 connected through a conventional push-rod and bell-crank linkage, only partly shown - see 26, 27, to a swash-plate 4 which in turn controls the pitch of rotor blades 5 of a conventional semirigid 6 or articulated rotor head so as to control lift and propulsion. Yaw control is provided by conventional rudder pedals 7 connected by a conventional cable or push-rod linkage, not shown, to a conventional anti-torque rotor 8 on the empennage.

The fuselage 1 provides support for an engine 9 which tranmits power by a belt drive 10 to a drive shaft 11 and thence to transmission 12. Power for yaw control is transmitted by a shaft 13 disposed between the belt drive 10 and the anti-torque rotor 8.

The transmission 12 is connected to a rotor shaft 15 and members 12 and 15 are jointly movable relative to airframe member 14 and fuselage 1 as hereafter further described.

The transmission 12 is mounted so that it can slide laterally on two slide rods or shafts 16 arranged between section 14 and 14a of the airframe as shown in FIG. 2. The slide rods 16 are disposed parallel in spaced relation and substantially equal distance from the axis of the rotor and fixedly connected to and supported by transversely extending brace members 18 which in turn are fixed to the airframe member 14.

The mounting on slide rods 16 is established by bearing sleeves 17 provided in complementary spaced relation on the transmission 12 and which are seated on the rods 16 for aforesaid lateral movement. In turn, the slide rods 16 are secured at each of their axial ends to cross braces 18 supported ultimately by the fuselage 1.

The lateral position of the transmission is controlled through a push-rod 20, bell-crank 21 and control rod 22, see FIG. 3. The rod 22 is operated by the pilot manually through a conventional push-rod and bell-crank linkage connected to a trim control or by a conventional electric or hydraulic trim motor, not shown.

Accordingly, with increasing forward speed, the tendency for the machine to roll towards the retreating side of the rotor disc can be counteracted by the pilot by shifting the lateral position of the transmission to keep the center of lift of the rotor system over the center of gravity of the machine without effecting a cyclic variation in the blade pitch. Alternately, the lateral movement of the transmission may be controlled automatically by a conventional stability augmentation system. In either case, the retreating blades are no longer required to support their normal proportion of the load. Thus the rotor speed can be lowered, eliminating advancing blade compressibility effects and improving hovering efficiency.

Because movement of the transmission 12 changes its position relative to the belt drive 10 and drive shaft 11, there are provided universal joints 23 and a spline shaft 24 interposed in spaced relation within the length of shaft 11, to accommodate angular and linear displacements.

The lateral movement of the transmission to counteract the roll tendency arising from dissymmetry of lift constitutes a control function. Thus, the lateral movement can be used for roll control independent of dissymmetry of lift requirements. Accordingly, cyclic pitch variations of the rotor blades would be required only for longitudinal tilting of the rotor disc for translational flight. This greatly simplifies the swash-plate mechanism as it has to respond only to fore-and-aft movement of the cyclic pitch stick 2. Lateral movement of the cyclic stick actuates control rod 22 through a conventional push-rod and bell-crank linkage.

The control of the helicopter is further simplified by a tilting mechanism for the transmission which entirely eliminates the need for a swash plate.

In this modification, the cross braces or supports 18 are rollably supported on and/or by a bow or arc-like structure 19 each of which is rigidly secured to airframe member 14, 14a. The structure 19 has a central body 19a and two diametrically extending arms 19b, 19c. The upper and lower surfaces of the structure 19 provides a circular arc whose center of curvature coincides with the rotorhead 6 position on the longitudinal axis of the rotor shaft 15. The bottom surface of arms 19b, 19c, is also continuous and its curvature extends parallel to the upper surface.

The cross braces are each provided with three (or more) shaft-like extensions 18a, 18b, 18c to receive thereon a roller - such as a conventional roller bearing. The shaft-like extension projects from the plate-like braces in a direction perpendicular to the rotor axis of shaft 15. The roller extensions 18a, 18b and 18c are arranged to form a triangle with upper roller extension 18a bearing upon the upper surface of the structure 19 to rollably support the weight of the transmission when the aircraft is on the ground. Roller extensions 18b and 18c each with a roller bearing thereon bear upon the bottom surface of the arms to rollably support the weight of the aircraft when in flight.

The engagement between structures 19 and the braces 18 is of a rolling contact nature to permit tilting of the transmission relative to the airframe. The tilt center of rolling contact occurs relatively close to the rotor head 6 and hence minimizes the control forces. These forces diminish as the distance between the tilt axis and the rotor head is decreased. The degree of tilt is controlled by control rod 29 acting upon and through brace members 18. Rod 29 in turn is actuated through a conventional push-rod and bell-crank linkage by the fore-and-aft movement of the cyclic pitch stick. With this arrangement only collective movement of blade pitch would be required in control of the helicopter. Because the transmission is free to tilt and translate, a flexible push-pull cable 26 is provided to transmit movement of the collective pitch stick 3 to blade pitch control rod 27. With a swash-plate mechanism no longer required, a conventional push-rod and bell-crank linkage can be used to actuate blade pitch control horns 28 by the control rod 27.

Because rotor disc tilt is accomplished by moving the entire transmission system, blade flapping plays no aerodynamic role in lift or propulsion. However, flapping hinges will relieve blade root stresses arising from gyroscopic procession and gust loading. The amplitude of flapping can be greatly minimized, however, by substantial delta-3 hinging. Minimizing flapping will reduce Coriolis forces and the resulting in-plane root stresses which are the major source of rotor vibrations that are transmitted to the fuselage.

This control system need not be restricted to the conventional single rotor helicopter. The invention would be particularly advantageous when applied to the coaxial counterrotating rotor system as it would permit the elimination of two swash-plates.

While there have been described what are at present considered to be the preferre embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. In a helicopter having an airframe;
   a transmission and rotor shaft connected thereto;
   a structural network movably connecting said transmission to said frame and including,
   a pair of spaced parallel co-extending slide rods arranged laterally relative to the length of the helicopter;
   support means securing said rods at each of the respective opposite ends thereof to said airframe;
   support means slidably mounted on said rods for axial relative movement therebetween and connected to said transmission;
   linkage means associated with said transmission for moving said transmission back and forth relative to said airframe laterally along and about said slide rods;
   a curved support structure at each end of said rods and connected to the airframe;
   roller means bearing upon said support structure;
   linkage means connecting to said transmission for moving said transmission rotatable about said support structure to effect tilting thereof in a longitudinal direction;
   a rotor engine supported stationary relative to the airframe;
   and power transmission means connecting to and between said engine and said transmission effective to accommodate angular and linear displacement of the transmission and rotor shaft relative to the airframe.

2. In a helicopter according to claim 1, wherein said rods are equally spaced from the axis of the rotor shaft.

3. In a helicopter according to claim 2, a common brace member at each axial end of said rods.

4. In a helicopter according to claim 1, wherein said curved support structure is shaped bow-like.

5. In a helicopter according to claim 1, wherein the axis of rotation of said roller means is perpendicular to the axis of the rotor shaft.

6. In a helicopter according to claim 5, wherein said support structure has a central body and two arms extending in diametrically opposite direction from said body, the upper and lower surfaces of the arms establishing a substantially continuous arc for rolling contact with said roller means.

7. In a helicopter according to claim 4, wherein said roller means includes a multiplicity of rollers, at least one thereof being in rolling contact with the upper surface of the bow-like structure and at least one thereof being in rolling contact with the lower surface of said structure.

* * * * *